(12) United States Patent  
Quero et al.

(10) Patent No.: US 8,801,442 B2
(45) Date of Patent: Aug. 12, 2014

(54) DEVICE FOR POSITIONING AT LEAST ONE MULTIPLE ROUND PLUG

(75) Inventors: Jose Quero, Bietigheim-Bissingen (DE); Steffen Lentmaier, Grossbottwar (DE); Mike Wenzel, Heilbronn (DE)

(73) Assignee: LQ Mechatronik-Systeme GmbH, Besigheim (DE)

( * ) Notice: Subject to any disclaimer, the term of this patent is extended or adjusted under 35 U.S.C. 154(b) by 132 days.

(21) Appl. No.: 13/298,609

(22) Filed: Nov. 17, 2011

(65) Prior Publication Data

US 2012/0127690 A1    May 24, 2012

(30) Foreign Application Priority Data

Nov. 17, 2010   (DE) ..................... 20 2010 015 763 U

(51) Int. Cl.
*H01R 13/44* (2006.01)

(52) U.S. Cl.
USPC ........... 439/136; 361/822; 361/825; 361/823; 361/809; 361/810; 174/541; 439/234; 439/247; 439/532; 439/94; 439/716

(58) Field of Classification Search
USPC .......... 361/822, 825, 823, 809, 810; 174/541; 439/136, 234, 247, 532, 94, 716
See application file for complete search history.

(56) References Cited

U.S. PATENT DOCUMENTS

| | | | | |
|---|---|---|---|---|
| 4,878,856 A | * | 11/1989 | Maxwell | 439/541.5 |
| 5,080,609 A | * | 1/1992 | Fabian et al. | 439/541.5 |
| 6,146,213 A | * | 11/2000 | Yoon | 439/716 |
| 6,171,142 B1 | * | 1/2001 | Wang et al. | 439/567 |
| 6,302,731 B1 | * | 10/2001 | Kring | 439/541.5 |
| 6,394,856 B1 | * | 5/2002 | Wertz | 439/681 |
| 6,631,076 B2 | | 10/2003 | Behr et al. | |
| 7,667,146 B2 | * | 2/2010 | Eckardt | 174/541 |
| 2002/0004343 A1 | * | 1/2002 | Morikawa | 439/716 |
| 2002/0089815 A1 | | 7/2002 | Behr et al. | |

FOREIGN PATENT DOCUMENTS

| | | |
|---|---|---|
| DE | 197 16 917 C1 | 4/1998 |
| DE | 197 43 974 A1 | 4/1999 |
| EP | 0 457 254 A2 | 11/1991 |
| EP | 1 213 805 A1 | 6/2002 |

OTHER PUBLICATIONS

Search report issued in European Patent Office for EP 11 18 9583 dated Jul. 17, 2012 with English translation of categories of cited documents (6 pages).

* cited by examiner

*Primary Examiner* — David M Sinclair
*Assistant Examiner* — Robert Brown
(74) *Attorney, Agent, or Firm* — Flynn, Thiel, Boutell & Tanis, P.C.

(57) ABSTRACT

A device for positioning at least one multiple round plug on a profiled support, including an adapter with a plurality of external functional surfaces wherein a first functional surface having latch-type profiles is provided for snap fastening the adapter onto the profiled support, and a further functional surface, offset from the first functional surface is provided with a retaining device for releasable attachment of the housing of a round plug. The adapter includes at least one space which is open toward at least one external functional surface and through which flexible cables can pass.

20 Claims, 4 Drawing Sheets

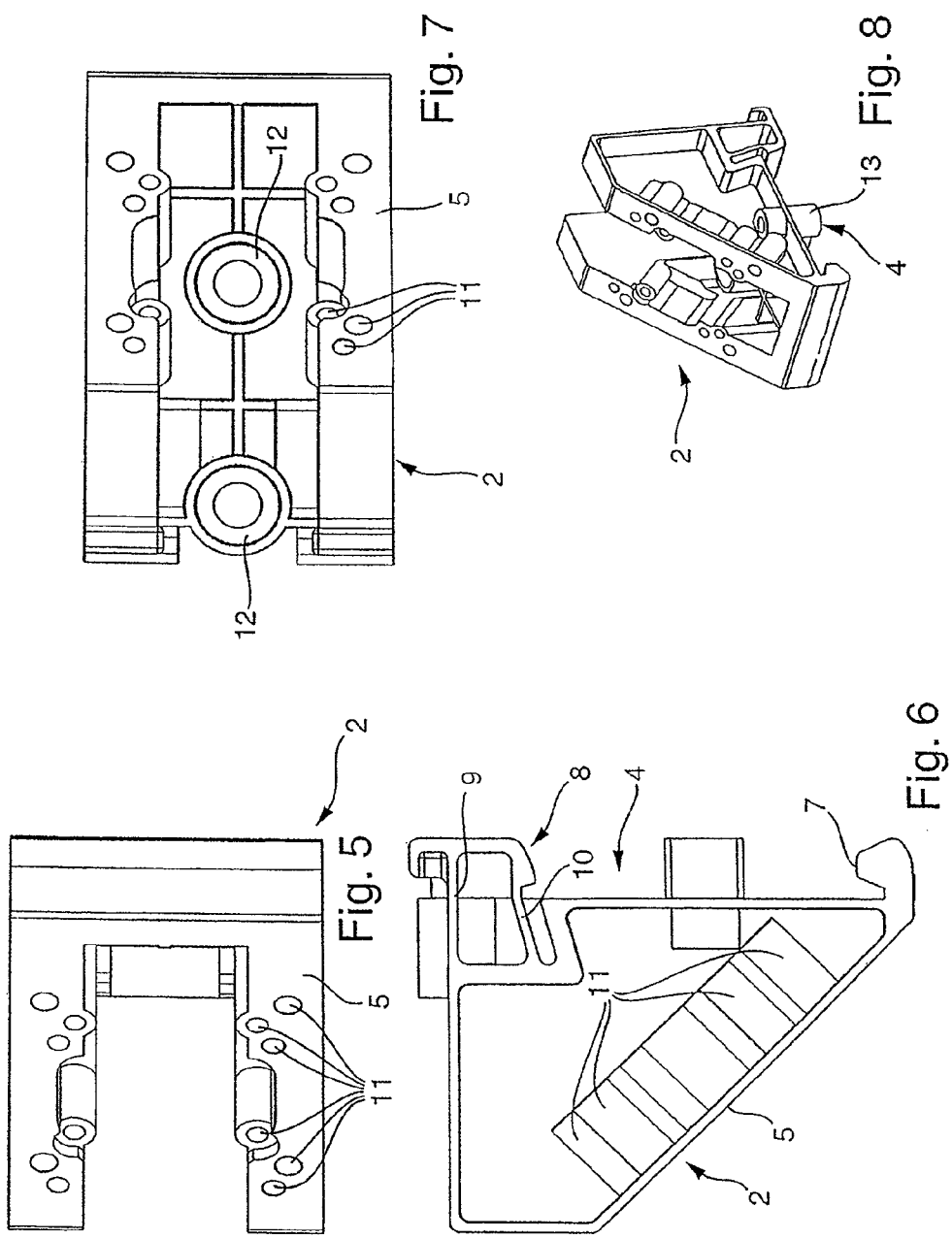

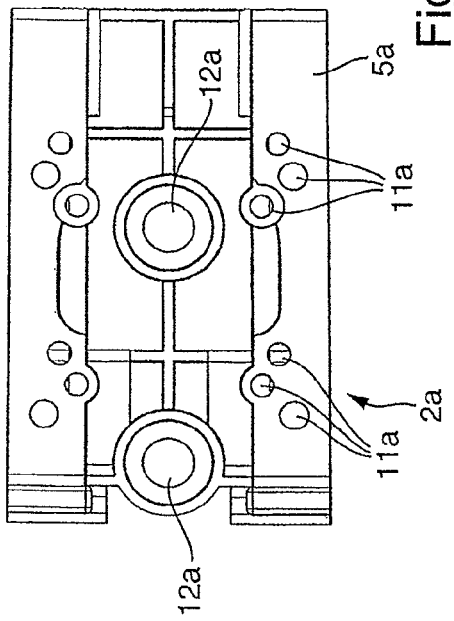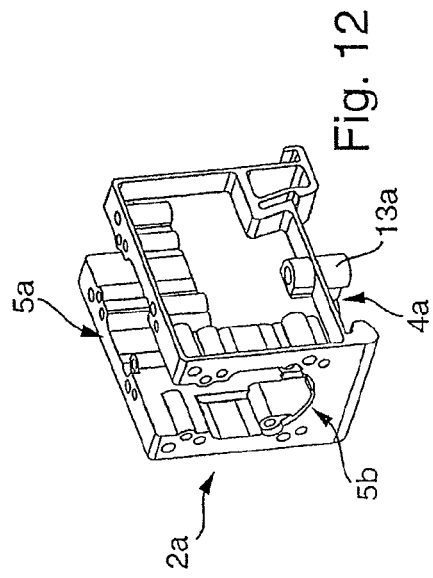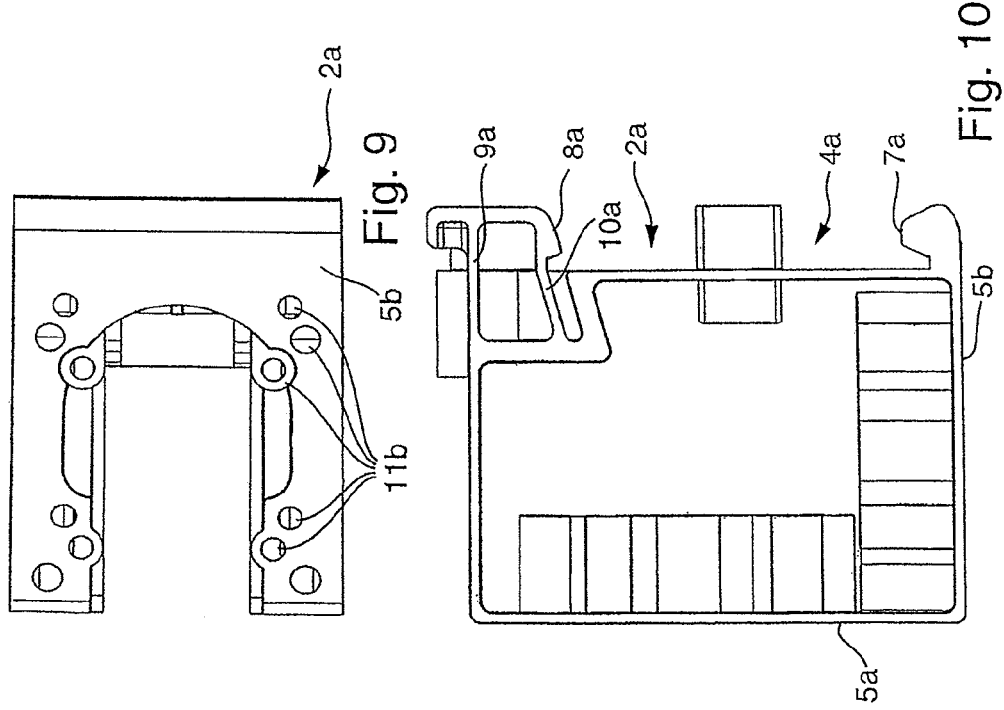

DEVICE FOR POSITIONING AT LEAST ONE MULTIPLE ROUND PLUG

FIELD OF THE INVENTION

The invention relates to a device for positioning at least one multiple round plug on a profiled support, more particularly a hat-shaped support, designed for holding functional modules, more particularly electromechanical modules.

BACKGROUND OF THE INVENTION

A switch cabinet comprising a plurality of functional modules mounted on a supporting rail is disclosed in DE 197 43 974 A1. The supporting rail is in the form of a hat-shaped profiled support, to which electrical and electronic functional modules can be snap mounted.

Practical embodiments of such types of switch cabinet further require multiple round plugs in order to provide connections for power supply and data lines.

It is an object of the invention to provide a device of the above type that makes it possible to effect simple and space-saving positioning of multiple round plugs on a profiled support for holding functional modules.

This object is achieved by the provision of an adapter comprising a plurality of functional surfaces which are disposed on the external surface of the adapter and of which a first functional surface is provided with a latch-type profile to enable the adapter to be snap mounted to the profiled support, and at least one additional functional surface, which is offset in relation to the first functional surface and which comprises retaining means for releasably attaching a housing of a round plug, and the adapter comprises at least one space that is open toward at least one functional surface disposed on the external surface of the adapter and that is intended to permit flexible cables to pass therethrough. The adapter of the invention makes it possible to securely position at least one multiple round plug on a profiled support. Furthermore, it ensures that a housing of a round plug is attached securely to the adapter. Finally, the adapter of the invention makes it possible to route cables in a space-saving manner in that the adapter comprises open regions through which cables can pass. In particular, multi-strand cables are provided in the form of flexible cables. Very advantageously, the solution of the invention is highly suitable for use in switch cabinets in installations and machines. Preferably, the profiled support is a mounting rail which is basically known from switch cabinet systems and onto which electrical, electronic, and electromechanical functional modules such as power supply units, circuit breakers, I/O modules, fuses, and transformers or similar functional modules can be snap mounted into place.

In one embodiment of the invention, the adapter is in the form of a single-piece component of plastics material. This makes it possible to fabricate the same in a simple and economical manner. The adapter is easy to handle by virtue of its design as a single-piece plastics component.

In a further embodiment of the invention, the adapter is in the form of a frame and comprises a plurality of profiled frame sections, which are joined together to form a polygonal element and which form the edge and corner regions of the adapter. On the one hand, the frame-like shape of the adapter contributes to a lightweight construction thereof. On the other hand, the frame-like design directly ensures the existence of an open space. Very advantageously, the profiled frame sections are formed by two frame members that protrude upwardly from a base and that delimit the space between them. The profiled frame sections are provided, like the base, with appropriate stiffening structures such as stiffening ribs or the like.

In a further embodiment of the invention, the functional surfaces provided with retaining means for attaching the round plug housing adjoin each other in a common peripheral direction and/or they adjoin the first functional surface provided with the latch-type profile. The additional functional surfaces start from the first functional surface, which serves as the base and is provided with the latch-type profile in a peripheral direction at right angles to the orientation of a profiled support, onto which the adapter can be snap mounted by way of its base.

In a further embodiment of the invention, the functional surfaces provided with the retaining means are flat in order to enable the mounting portions of each round plug housing to be placed flat against the functional surfaces. The flat shape of the functional surfaces enables corresponding mounting elements, more particularly mounting flanges, of the respective round plug housing to be placed securely and fixed in position on the functional surfaces.

In a further embodiment of the invention, the retaining means are in the form of receiving holes provided in the profiled frame sections. Mounting screws retained in the mounting portions of the respective round plug housing can be screwed into the receiving holes.

In a further embodiment of the invention, a plurality of receiving holes of a functional surface is disposed so as to be complementary to screw threaded holes in the mounting elements of the round plug housings of various sizes. Thus it is alternatively possible to mount a round plug housing of a different size on a functional surface of the adapter without having to provide additional mounting holes or the like for this purpose. Thus the adapter can be suitable for mounting different round plugs without the necessity of being individually configured to match such different round plugs.

In a further embodiment of the invention, the functional surfaces that are provided with retaining means are oriented at angles ranging from 90° to 180°, more particularly angles of 90° and 180° or 135°, in relation to the first functional surface provided with the latch-type profile. In an adapter comprising functional surfaces that are oriented at an angle of 90° and 180°, it is possible to position two round plugs on the adapter. When the functional surfaces are oriented obliquely at an angle of 135°, it is advantageous to mount a single round plug.

In a further embodiment of the invention, the latch-type profile provided on the first functional surface comprises at least one rigid locking projection and at least one resilient latch on the side opposite to the locking projection. Preferably, the base of the adapter is first hooked by means of the rigid locking projection onto a corresponding side of a hat-shaped profiled support and then snap mounted by means of the at least one opposing, resilient latch onto the opposite side of the profiled support. This enables the adapter to be mounted on the profiled support, more particularly on a mounting rail, or demounted therefrom, in both cases without the use of tools.

BRIEF DESCRIPTION OF THE DRAWINGS

Additional advantages and features of the invention are revealed in the claims and the following description of preferred exemplary embodiments of the invention described below with reference to the drawings, in which:

FIG. 5 is a front view of the adapter shown in FIGS. 1 and 2, FIG. 6 is a side view of the adapter shown in FIG. 5, FIG. 7 is a top view of the adapter shown in FIGS. 5 and 6, FIG. 8 is a perspective view of the adapter shown in FIGS. 5 to 7, FIG. 9 is a front view of the adapter shown in FIGS. 3 and 4, FIG. 10 is a side view of the adapter shown in FIG. 9, FIG. 11 is a top view of the adapter shown in FIGS. 9 and 10, and FIG. 12 is a perspective view of the adapter shown in FIGS. 9 to 11.

DETAILED DESCRIPTION

Figure 1:
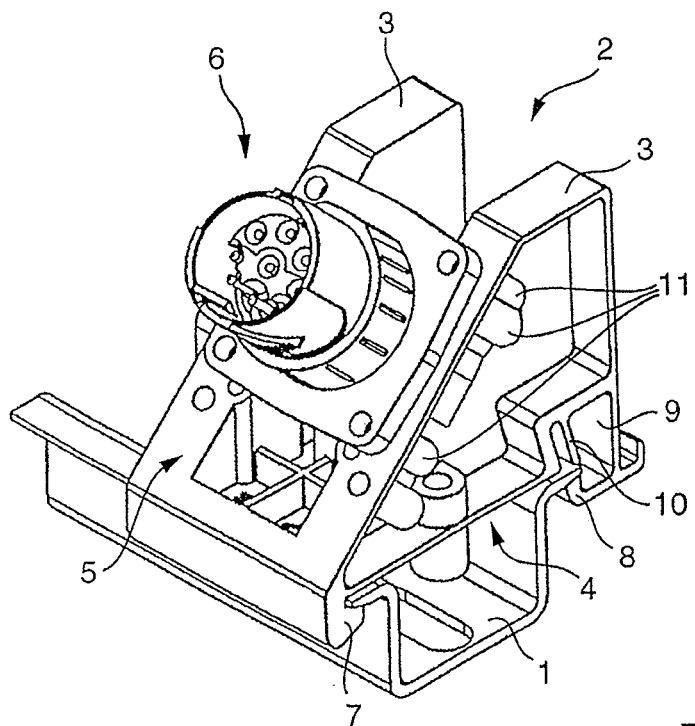
FIG. 1 is a perspective view of a first embodiment of a device of the invention for positioning a round plug on a mounting rail.
Figure 2:
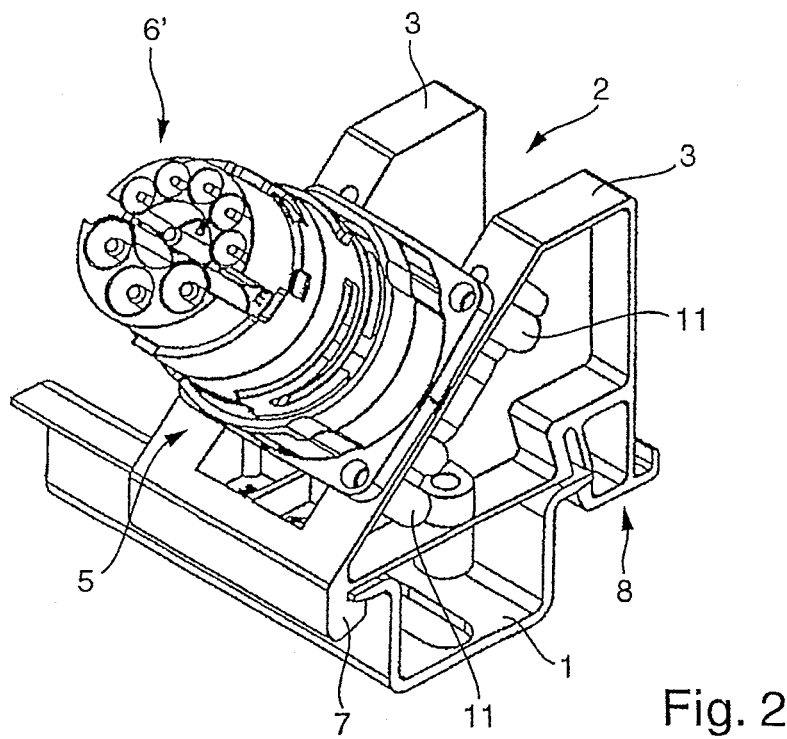
FIG. 2 shows an adapter illustrated in FIG. 1 for positioning a larger round plug relative to the mounting rail.
Figure 3:
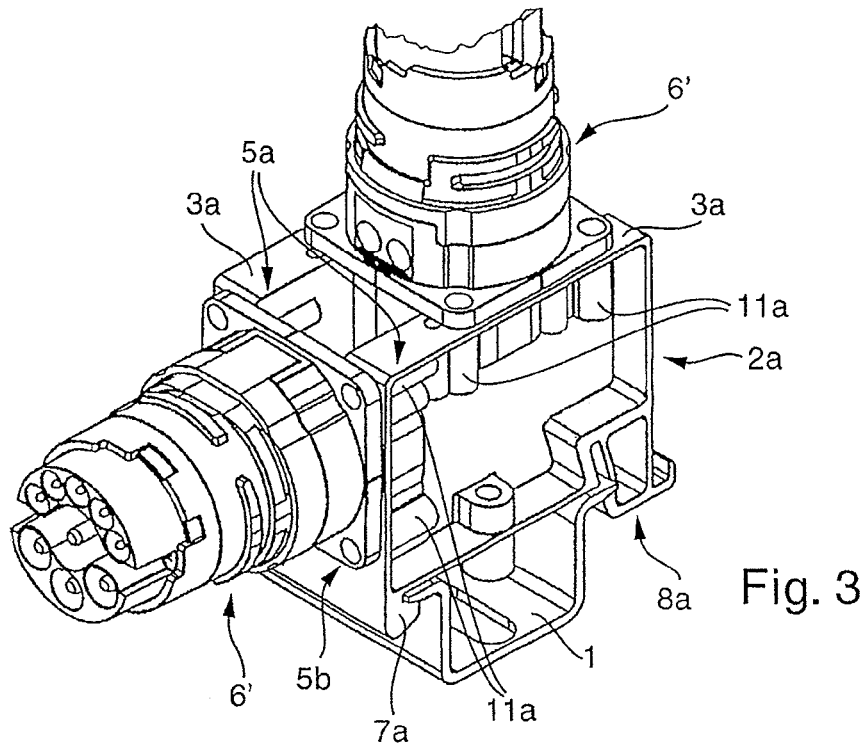
FIG. 3 shows a further embodiment of the invention comprising an adapter that has two functional surfaces that are each used for attaching a round plug.
Figure 4:
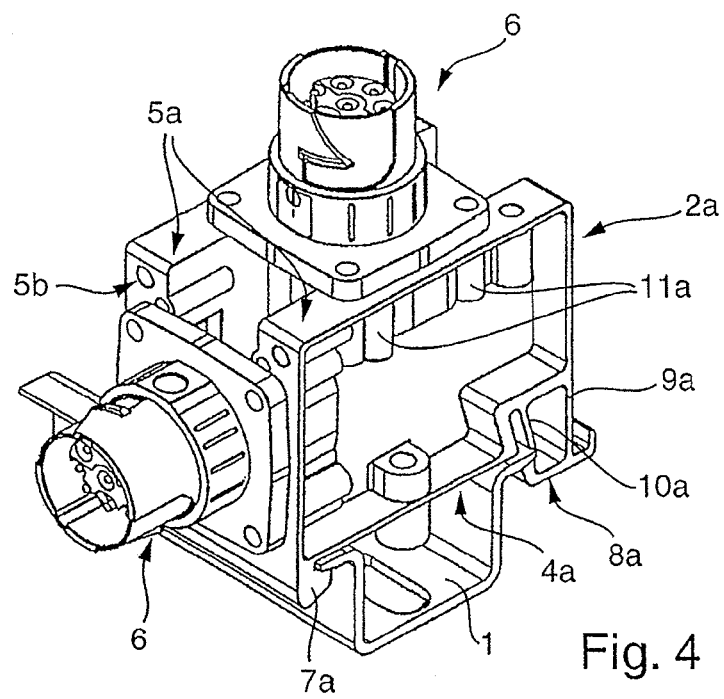
FIG. 4 shows the adapter illustrated in FIG. 3, to which smaller round plugs are attached.

FIGS. 1 to 4 show a hat-shaped profiled support in the form of a mounting rail 1 used in switch cabinets in mechanical and plant engineering in order to make it possible to fix electrical and electromechanical functional components involving the power supply and the control and monitoring of machines and installations, on the mounting rail 1. For connecting the power supply and electronic data link to the appropriate functional components inside a switch cabinet, use is also made of electrical plug-and-socket connectors that comprise round plugs 6, 6'. The round plugs 6, 6' are multiple round plugs that are designed and fabricated according to industrial standards such as DIN or ISO or the like. In order to make it possible to position such types of round plugs 6, 6' in a space-saving manner and exactly in the region of said functional components inside a switch cabinet, there are provided the adapters 2, 2a of the invention, which are described below with reference to FIGS. 1 to 12. There are provided two embodiments of adapters 2, 2a of the invention used for mounting multiple round plugs and for positioning these round plugs on an appropriate mounting rail 1. The two adapters 2, 2a are identical in terms of their base 4, 4a described below in more detail. The functional components of the two adapters 2, 2a that have the same functions or that are identical are provided with the same reference numerals, but the letter 'a' is added to the reference numerals to designate the functional components of the adapter 2a.

The mounting rail 1 is made of metal, preferably sheet steel, and is attached to a mounting platform of the switch cabinet or a module-supporting plate. The adapter 2 and the adapter 2a are snap mounted on this mounting rail 1 by way of their bases 4, 4a respectively. For this purpose, the two adapters 2, 2a comprise a first latch-type profile in the form of a rigid locking projection 7, 7a that extends over the entire width of the adapter 2, 2a. This locking projection 7, 7a engages underneath a laterally protruding side of the mounting rail 1. In the mounted state of the adapter 2, 2a, an opposing lateral side of the mounting rail 1 is surrounded by two resilient latches 8, 8a situated at the same level as the locking projection 7, 7a. The two latches 8, 8a represent a bridge between two slightly resilient, narrow supporting legs 9, 10; 9a, 10a, the resilience of which is sufficient to make flexible displacement of the latch 8 possible in its latching plane between a front, locking position, in which the latch 8 engages behind the edge of the mounting rail 1, and a rear, unlocking position, in which the latch 8 disengages from the edge of the mounting rail 1. The two resilient supporting legs 9, 10; 9a, 10a form a parallelogram linkage for the latch 8 that enables the latch 8 to be displaced approximately in the latching plane and thus at the level of the locking projection 7, 7a. The base 4, 4a serving as the first functional surface further comprises passageways 12, 12a for screw threaded elements in order to make it possible to secure the adapter 2, 2a axially, without the intervention of the mounting rail 1, directly on the mounting platform in the switch cabinet, on the module-carrying board, or on any other supporting component. In the state in which the adapter 2, 2a is snap mounted to the mounting rail, the adapter 2, 2a is held on the mounting rail non-positively in the axial direction.

Both the adapter 2 and the adapter 2a comprise, in the region of their bases 4, 4a, female fixing elements 13, 13a, by means of which the adapter 2, 2a can be mounted directly on the mounting platform of the switch cabinet, on the module-supporting plate or any other supporting component. The female fixing elements 13, 13a are configured such that mounting screws can be passed through the mounting platform, the module-supporting plate or any other supporting component from a rear side thereof and screwed into the female fixing elements 13, 13a. The mounting screws cut their own thread as they enter the female fixing elements 13, 13a. The corresponding female fixing elements 13, 13a for the adapters 2 and 2a can be seen in FIGS. 8 and 12 respectively.

Each of the two adapters 2, 2a is made of plastics material in the form of a single-piece component. Apart from the base 4, 4a, each adapter 2, 2a comprises at least one further functional surface 5, 5a, 5b that is provided with retaining means for anchoring a housing of a multiple round plug 6, 6'. The adapter 2 shown in FIGS. 1, 2, and 5 to 8 comprises a bottom portion which includes the base 4 and in which the screw passageways 12 are also provided. Two side limbs 3 protrude from the bottom portion on opposing longitudinal sides of the bottom portion at right angles thereto, which two side limbs 3 leave an open space between them to serve as a space for laying cables therethrough, as can be clearly seen from FIGS. 1, 2, 5, 7, and 8. The side limbs 3 are each triangular in shape and they form a functional plane in the region of their front face, which functional plane is oriented obliquely at an angle of 135° relative to the base 4 and which forms the functional surface 5 and thus the retaining and supporting surface for the housing of the round plug 6, 6'. The angle of 135° is measured in the peripheral direction extending perpendicularly to the longitudinal axis of the mounting rail 1, starting from the base 4 as the zero level. It can be seen from the side view shown in FIG. 6 that the base 4 and the functional surface 5 enclose an angle of 45°. The side limbs 3 of the adapter 2 are provided with rib-like stiffeners. Also provided are receiving holes 11 in the region of the oblique functional surface 5, which receiving holes 11 form components of the retaining means for mounting the housing of the round plug. The receiving holes are intended to accommodate the mounting screws, which are passed through corresponding bores in rectangular mounting flanges of the respective round plug housing. The side limbs 3 are disposed at a distance from each other such that the rectangular mounting flanges of the round plug housing can be fitted flat on the front face of the side limbs 3 and thus on the functional surface 5. Furthermore, the different receiving holes 11 that are provided integrally in corresponding portions of the side limbs 3 of increased material thickness are positioned such that they are complementary to round plugs 6, 6' of at least two different sizes and their respective housing flanges. As can be seen from FIGS. 1 and 2, the passageways in the mounting flange of the small round plug 6 and the passageways in the mounting flange of the large round plug 6' align with corresponding receiving holes 11 in the adapter 2 after the round plugs 6, 6' have been mounted on the functional surface 5. In order to mount the respective round plug 6, 6', it is merely necessary to pass appropriate screws through the bores of the mounting flange and tighten them in the receiving holes 11 in order to fix the corresponding round plug housing to the adapter 2. The receiving holes 11 are configured such that a screw cuts its own thread as it is screwed into the receiving holes 11. Appropriate cables that enter the round pug 6, 6' from the rear pass in a simple manner through the space formed between the two side limbs 3.

The adapter 2a of the embodiment shown in FIGS. 3, 4, and 9 to 12 differs from the adapter 2 in that it comprises two functional surfaces 5a, 5b in addition to the base 4a, in order to make it possible to attach the round plugs 6, 6'. The following description relates only to the differences between the adapter 2a and the adapter 2 shown in FIGS. 1, 2, and 5 to 8 or only to the features that have not been explained in detail in the preceding embodiment. For the features that are identical to those of the preceding embodiment, reference is made to the description of the embodiment shown in FIGS. 1, 2, and 5 to 8 in order to avoid repetition. Similarly to the bottom portion of the adapter 2 described above, the adapter 2a comprises a bottom portion, which is provided with the base 4a and passageways 12a for directly fixing the adapter 2a axially on a supporting component. Two side limbs 3a, each rectangular in shape, protrude from the bottom portion at right angles thereto. The side limbs 3 define two flat functional surfaces 5a and 5b. A functional surface 5b near to the front face is oriented at right angles and thus at an angle of 90° relative to the base 4a, when regarded in the peripheral direction of the adapter 2a. The additional functional surface 5a is disposed opposite to the base 4a in the region of a top surface of the adapter 2a. The top functional surface 5a is oriented at right angles to the front functional surface 5b and is thus at an angle of 180° in relation to the base 4a serving as the zero level. Both functional surfaces 5a, 5b are provided for the purpose of mounting a housing of a round plug 6, 6'. For this purpose, there are provided corresponding receiving holes 11a in the functional surfaces 5a, 5b and thus also in the side limbs 3a, which receiving holes 11a are oriented so as to be complementary to the passageways in the mounting flanges of the round plugs 6, 6' and are formed in corresponding portions of the side limbs 3a that have increased material thickness. Both the positioning of the receiving holes 11a and the number of receiving holes 11a in the side limbs is adapted to match the passageways in the mounting flanges of the round plug housing. A space is provided between the two side limbs 3a, which space is open toward the top, toward the front face and toward the rear of the adapter 2a and which is used for laying cables therethrough, as can be clearly seen from FIGS. 3, 4, and 9, 11, 12.

The base 4a is provided with a locking projection 7a and with two latches 8a in the same way as the adapter 2. Reference is therefore made to the previous disclosure of the adapter 2 in the description, to avoid repetition.

The invention claimed is:

1. A device for positioning at least one round plug on a hat-shaped profiled support for holding electromechanical functional modules, the device comprising an adapter having a plurality of external functional surfaces including a first functional surface having latch-type profiles for snap fastening said adapter onto a profiled support, and a plurality of further functional surfaces offset from said first functional surface and each defining a distinct mounting position for a round plug to allow mounting of a round plug at different relative locations along said adapter at one of said mounting positions, each of said further functional surfaces including a retaining arrangement configured for releasable attachment to a housing of a round plug, and said adapter comprising at least one space which is open towards the further functional surfaces and through which flexible cables can pass.

2. The device as defined in claim 1, wherein said adapter is in the form of a single-piece component constructed of plastics material.

3. The device as defined in claim 1, wherein said adapter has an open frame design including a plurality of profiled frame sections connected together to form a polygonal body and forming edge and corner regions of said adapter.

4. The device as defined in claim 1, wherein said further functional surfaces adjoin each other in a common peripheral direction and/or adjoin said first functional surface.

5. The device as defined in claim 1, wherein said further functional surfaces each include a flat surface to accommodate flat fixing elements of a housing of a round plug.

6. The device as defined in claim 3, wherein the profiled frame sections define the further functional surfaces and said retaining arrangements include receiving holes provided in the further functional surfaces.

7. The device as defined in claim 6, wherein a plurality of said receiving holes in the respective further functional surfaces are disposed so as to be complementary to screw holes in fixing elements of round plug housings of different sizes.

8. The device as defined in claim 1, wherein said further functional surfaces are oriented at angles ranging from 90° to 180°.

9. The device as defined in claim 8, wherein said latch-type profiles comprise at least one dimensionally stable locking projection on one side of said adapter and at least one resiliently yielding snap lug on a side of said adapter opposite to said locking projection.

10. The device as defined in claim 8, wherein said further functional surfaces are oriented at an angle of 90° or 180° in relation to said first functional surface.

11. The device as defined in claim 1, wherein said adapter further includes a base on which said first functional surface is provided and a pair of laterally spaced-apart frame sections connected to and projecting outwardly from opposite longitudinal sides of said base, each said frame section including a first frame portion, said first frame portions being disposed adjacent one another and together defining one of said further functional surfaces, each said frame section including a second frame portion, said second frame portions being disposed adjacent one another and being connected to respective outer ends of said first frame portions, said second frame portions together defining an additional one of said further functional surfaces.

12. The device as defined in claim 11, wherein said first frame portions of the respective frame sections each define a surface which faces outwardly and said surfaces are coplanar with one another and together define said one further functional surface, and said second frame portions of the respective frame sections each define a surface which faces outwardly and said surfaces of said second frame portions are coplanar with one another and together define said additional further functional surface.

13. The device as defined in claim 12, wherein said first and second frame portions, and said one and said additional further functional surfaces thereof, are oriented transversely relative to one another.

14. The device as defined in claim 1, wherein said plurality of further functional surfaces includes two functional surfaces which are oriented transversely relative to one another.

15. An adapter device for positioning an electrical plug and socket connector, said adapter device comprising a base including first and second latch profiles configured for resiliently fastening said adapter device on a profiled support for holding electromechanical functional modules in a switch cabinet, and first and second support surfaces spaced from said base, each said first and second support surface including a retaining arrangement configured for releasably attaching a housing of an electrical plug and socket connector to said adapter device, each said first and second support surface being disposed to define a discrete mounting location for a plug and socket connector to allow mounting of a plug and socket connector at different relative positions on said adapter at one of said mounting locations, said adapter further comprising a space open towards said first and second support surfaces for accommodating cabling.

16. The adapter device of claim 15, wherein said adapter device includes a pair of laterally spaced-apart frame sections connected to and projecting outwardly from opposite sides of said base, wherein first portions of the respective frame sections disposed in opposed but adjacent relation with one another each define a surface which faces outwardly, said surfaces of said first portions being coplanar with, and laterally spaced-apart from, one another and together defining said first support surface, and wherein second portions of the respective frame sections disposed in opposed but adjacent relation with one another each define a surface which faces outwardly, said surfaces of said second portions being coplanar with, and laterally spaced-apart from, one another and together defining said second support surface, said first support surface being oriented transversely with respect to said second support surface.

17. The adapter device of claim 16, wherein said first portions of said frame sections have respective first ends connected to an end region of said base and second ends spaced from said base and connected to ends of the respective said second portions of said frame sections.

18. The adapter device of claim 16, wherein said surfaces which define said first and second support surfaces are flat and said retaining arrangements each comprise a plurality of receiving holes arranged in said flat surfaces to accommodate plug and socket connectors of different sizes.

19. The adapter device of claim 15, wherein said first latch profile of said base includes a rigid and dimensionally stable locking projection disposed on a lower region of said base adjacent a first end thereof and configured to engage with a first edge of a profiled support for holding electromechanical functional modules in a switch cabinet, and said second latch profile of said base includes a resiliently-yielding snap lug spaced from said locking projection and disposed on said lower region of said base adjacent a second end thereof, said snap lug being configured to engage with a second edge of a profiled support for holding electromechanical functional modules in a switch cabinet.

20. The adapter device of claim 15, wherein said first and second support surfaces are connected to one another and are oriented transversely relative to one another.

* * * * *